United States Patent [19]

Iwasaki et al.

[11] Patent Number: 4,773,890
[45] Date of Patent: Sep. 27, 1988

[54] SLIDABLE-TYPE HOMOKINETIC (UNIVERSAL) TRIPOD JOINT

[75] Inventors: Keiji Iwasaki, Yokohama; Yukimitsu Yamamoto, Yokkaichi; Masao Kato, Kuwana; Mikio Banno, Aichi, all of Japan

[73] Assignee: NTN Toyo Bearing Co., Ltd., Osaka, Japan

[21] Appl. No.: 33,285

[22] Filed: Apr. 2, 1987

[30] Foreign Application Priority Data

Apr. 2, 1986 [JP] Japan .................................. 61-75876

[51] Int. Cl.⁴ ................................................ F16D 3/20
[52] U.S. Cl. .................................... 464/111; 464/124; 464/905
[58] Field of Search ............... 464/111, 122, 123, 124, 464/132, 905

[56] References Cited

U.S. PATENT DOCUMENTS

| 3,748,869 | 7/1973 | Orain | 464/132 |
| 4,167,860 | 9/1979 | Sakaguchi et al. | 464/111 |
| 4,192,154 | 3/1980 | Nakamura et al. | 464/111 |
| 4,379,706 | 4/1983 | Otsuka et al. | 464/124 X |
| 4,571,214 | 2/1986 | Orain | 464/111 |

Primary Examiner—Daniel P. Stodola
Attorney, Agent, or Firm—Armstrong, Nikaido, Marmelstein & Kubovcik

[57] ABSTRACT

A slidable-type homokinetic tripod joint includes an outer member formed with track grooves, a tripod member having three trunnions and mounted in the outer member with the trunnions on the tripod member received in the track grooves in the outer member, and a spherical roller rotatably mounted on each trunnion. Each track groove is formed at each side with a guide surface for the spherical roller. The spherical roller is kept in contact with the roller guide surface at two points. This decreases unbalanced load and the turning moment acting on the spherical roller and decreases the friction force causing vibration.

7 Claims, 4 Drawing Sheets

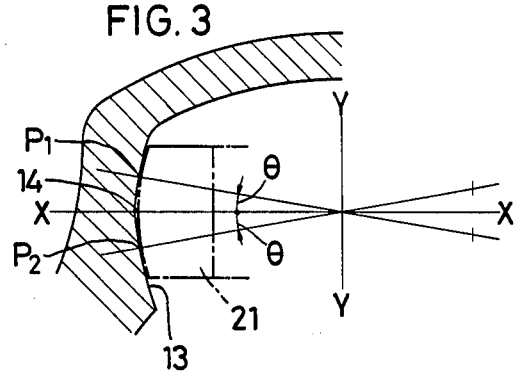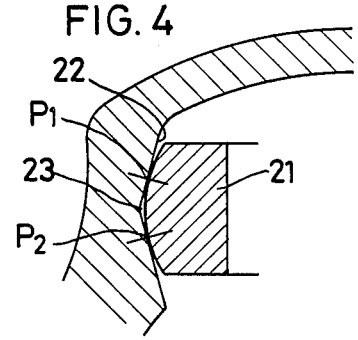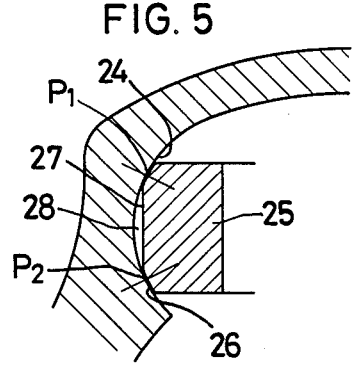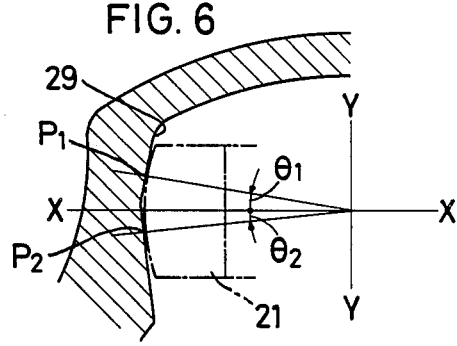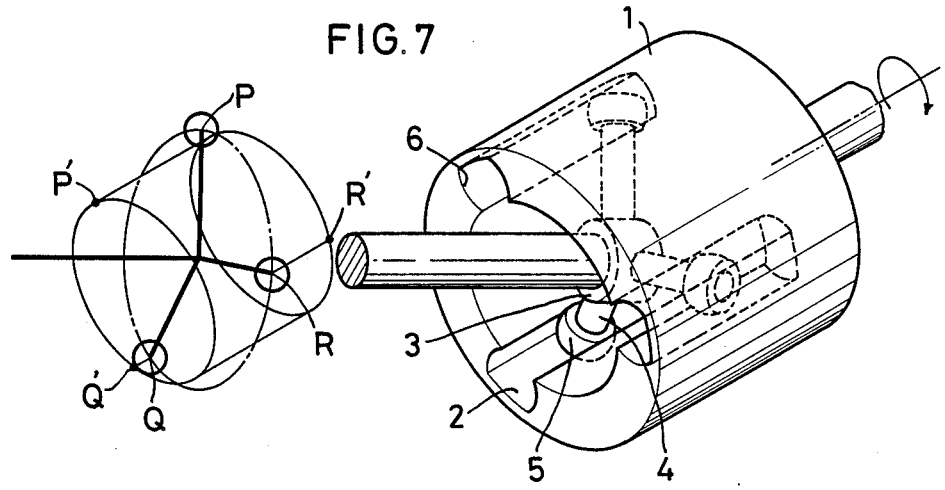

SLIDABLE-TYPE HOMOKINETIC (UNIVERSAL) TRIPOD JOINT

The present invention relates to a homokinetic universal joint used mainly for front wheel drive vehicles, and particularly to a tripod type homokinetic universal joint.

As a conventional universal joint of this type, the one shown in FIG. 8 is known which comprises an outer ring 1 formed in its internal surface with three cylindrical track grooves 2 extending axially, a tripod member 3 mounted in the outer ring 1 and provided with trunnions 4 radially extending, and spherical rollers 5 rotatably and axially slidably mounted on the trunnions 4. Each spherical roller 5 is adapted to engage guide surfaces 6 formed on both sides of the track groove 2.

On a homokinetic universal joint of this type, when transmitting the rotation with the outer ring 1 forming a working angle with respect to the tripod member 3, each spherical roller 5 plunges obliquely with respect to the guide surface 6 on the cylindrical track groove 2 as shown in FIGS. 8 and 9, so that a normal rolling movement of the spherical roller 5 is hindered.

Namely, although each spherical roller 5 tends to roll in the direction shown by arrow (a) in FIG. 8, it is forced to move along each track groove 2 which is cylindrical and parallel with the axis of the outer ring 1. As a result, slip can occur between the guide surfaces 6 on the track grooves 2 and the spherical rollers 5, (21) causing heat buildup and an axial thrust which invites vibrations.

FIG. 10 is a graph showing the relationship between the phase angle of joint and the induced thrust.

The mechanism of the induced thrust being produced will be described below with reference to FIG. 7. FIG. 7 shows how the members of either a conventional joint as shown in FIG. 8 or a joint in accordance with the present invention as shown in FIGS. 1-6 are positioned when transmitting the rotation with the outer ring 1 (10) forming a working angle with respect to the tripod member 3 (15).

The reference numerals used in FIG. 7 are those of a conventional joint as shown in FIG. 8. Reference numerals of the corresponding parts of the present invention are given hereinbelow in parentheses.

When the joint rotates, the spherical rollers 5 (21) mounted on the trunnions 4 (20) of the tripod member 3 (15) reciprocate in the axial direction of the outer ring 1 (10) along the guide surfaces 6 (13) of the outer ring 1 (10). As shown in FIG. 7, three spherical rollers 5 (21) make a slidal movement from point P to P', Q to Q' and R to R', respectively, and then move back to the original position, making one round trip on each guide surface 6 (13) per rotation of the joint. The contact force acting between, the guide surfaces 6 (13) and the spherical rollers 5 (21) induces an axial thrust.

The direction and intensity of the thrust produced by each spherical roller 5 (21) vary with the phase of rotation. As shown in FIG. 7, two of three spherical rollers 5 (21) are pulled to the lefthand side of the outer ring 1 (10) and the other one is pulled to its righthand side, so that a compressive thrust is induced.

As shown in FIG. 10, the sum of the thrusts produced by three spherical rollers 5 changes periodically from positive to negative and vice versa three times per rotation of the joint. The amplitude in a conventional joint is so large as to cause various problems about vibrations on vehicles. Further, in a conventional joint since the area where the spherical roller 5 contacts the guide surface 6 has the same one curvature, an edge load is liable to build up on the guide surface 6 with the movement of the spherical rollers 5 on the trunnions 4. Also, an increase in the induced thrust resulting from unbalanced load and the breakage at the shoulders of the guide surfaces 6 shorten the life of the conventional joint.

An object of the present invention is to provide a tripod type homokinetic universal joint which obviates the abovesaid shortcomings, and which reduces the induced thrust, thus eliminating the problems relating to vibrations.

In accordance with the present invention, there is provided a universal joint in which the roller guide surfaces formed on both sides of each track groove formed in the outer ring are adapted to be in contact with the spherical roller at two points.

In the homokinetic universal joint of the present invention, power transmission is carried out through the engagement between the guide surfaces and the spherical rollers as in the conventional homokinetic universal joint. The spherical rollers roll along the roller guide surfaces for smooth plunging.

When transmitting the rotation with the axis of the outer ring aligned with the axis of the tripod member (that is, when the working angle is zero degree), since the point of intersection of the axes of the trunnions is on the axis of the outer ring, the spherical rollers roll, keeping contact with the roller guide surfaces at two points.

Even when the rotation is transmitted taking a working angle, each spherical roller is always in contact with the roller guide surfaces at two points adjacent to the center of the roller guide surface, though the intensity of the contact force varies with the phase of rotation. This assures a stable operation of the joint.

The results of analysis taking into consideration the internal friction force show that the intensity of the induced thrust on the homokinetic universal joint of the present invention is lower than that on the conventional ones by about 20 percent (FIG. 10).

On the other hand, according to laboratory experiments, it is found out that the induced thrust is by 30-40 percent lower than that of the conventional joint partly because each roller guide surface is in such a shape that the spherical roller contacts it at two points and partly because an oil sump formed thereby improves lubricity.

The homokinetic universal joint in accordance with the present invention has the following effects:

(a) Since each spherical roller makes contact with the guide surface at two points adjacent to the center of the guide surface, this decreases the unbalanced load and the turning moment which acts on the spherical roller around an axis perpendicular to the axis of the trunnion. This decreases the friction force which causes vibrations.

(b) Since the spherical roller makes contact with the guide surface at two points adjacent to the center of the guide surface, the area of contact stress occurring at the side edges of the spherical roller does not run over the roller guide surface.

(c) Since an oil sump is formed at the central portion of the roller guide surface, a lubricant is always supplied to between the roller guide surface and the spherical roller, thus preventing not only fretting corrosion but abnormal friction and heat buildup.

(d) Since the roller guide surfaces and the oil sump can be easily formed by ironing, no specific machining is necessary as in the conventional joint.

Other objects and features of the present invention will become apparent from the following description taken with reference to the accompanying drawings, in which:

FIG. 3 is an enlarged view of a portion of the same;

FIGS. 4, 5 and 6 are enlarged views of the same portion of other embodiments;

FIG. 7 is a diagrammatic view showing how the joint of the present invention and a conventional joint function;

Figure 1:
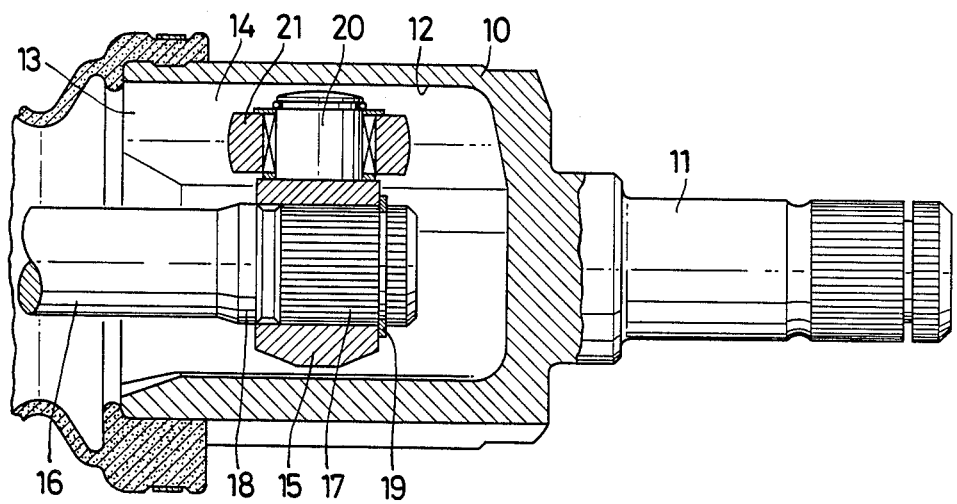
FIG. 1 is a vertical sectional side view of an embodiment of a homokinetic universal joint in accordance with the present invention.
Figure 2:
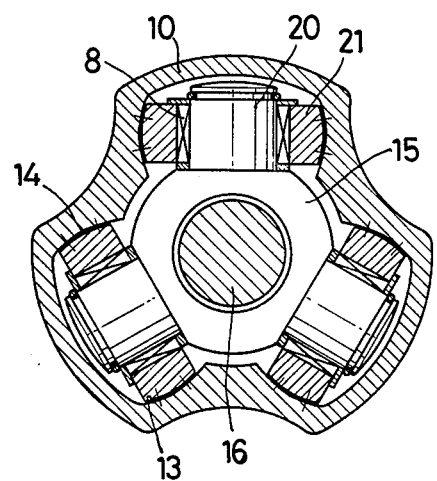
FIG. 2 is a vertical sectional front view of the same.
Figure 8:
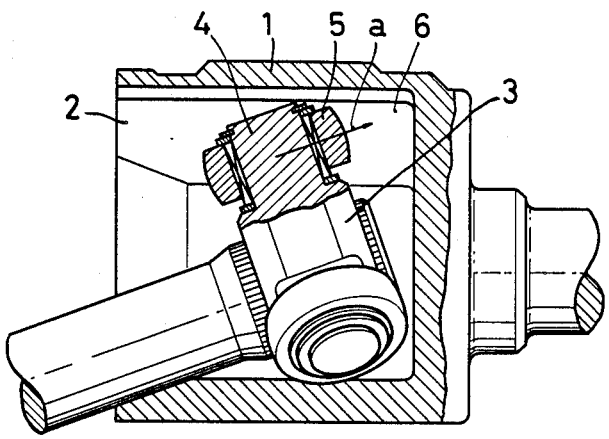
FIG. 8 is a vertical sectional side view of a conventional homokinetic joint.
Figure 9:
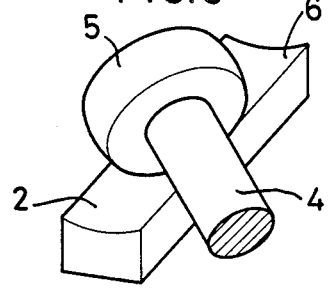
FIG. 9 is a perspective view showing how the spherical roller rolls on the joint of FIG. 8.
Figure 10:
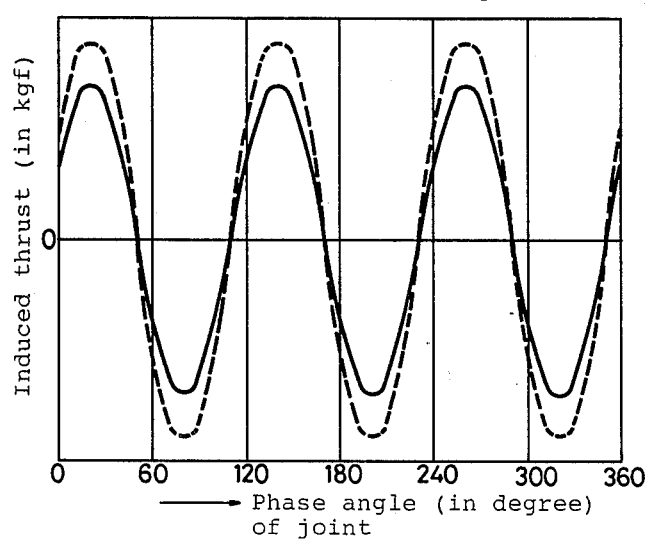
FIG. 10 is a graph showing the relationship between the phase angle and the induced thrust formed on each trunnion for the conventional joint and for the joint of the present invention and FIG. 11 is an enlarged portion of yet another embodiment of the present inventions.

Now referring to FIGS. 1 through 4, an outer ring 10 is integrally provided with a first shaft 11 at its closed end and formed with three axial track grooves 12 in its internal surface arranged at equal angular intervals of 120 degrees, as in the conventional joint. Each track groove 12 has at each side a roller guide surface 13 having two centers of curvature, thus taking the form of a gothic arch, with an axially extending oil sump 14 formed at its central portion. The radii of curvature corresponding to the centers of curvature may be different from each other or equal to each other.

A tripod member 15 mounted in the outer ring 10 engages a serration 17 formed on one end of a second shaft 16 and is held between a stepped portion 18 and a clip 19 so as not to slip off. The tripod member 15 is provided with three radially extending trunnions 20 on each of which a spherical roller 21 is rotatably mounted through a plurality of needle rollers 8.

In the first embodiment of the present invention shown in FIG. 3, the contact points P1 and P2 between the spherical roller 21 and the roller guide surface 13 are positioned at the central portion of the guide surface 13 so that $\theta = 10°-20°$. (The contact angle $\theta$ is an angle formed between the center line of the spherical roller and a line connecting one of the contact points with the center of the spherical roller.) and each spherical roller will not contact the central portion and side edges of each guide surface 13. So, side edges of the spherical rollers 21 do not contact the roller guide surface 13 and the area of contact stress occurring at the side edges does not run over the roller guide surface 13. Thus, there is no fear of unbalanced load on the spherical roller 21 causing the needle rollers 8 to skew, increasing the frictional resistance.

Further, since the contact points P1 and P2 are positioned at points adjacent to the central portion of the guide surface 13, the turning moment is decreased which acts on the spherical roller 21 around its axis X—X, resulting from the friction force in a direction perpendicular to the plane of FIG. 3 caused by the load acting on the contact points P1 and P2. The movement of each trunnion 20 in the direction of line Y—Y with respect to the spherical roller 21 (due to the fact that the unbalanced loads act on P1 and P2) is smoothened, decreasing an induced thrust. The ratio of the diameter of the roller guide surface 13 to that of the spherical roller 21 should preferably be 1.10 to 1.40.

FIG. 4 shows the second embodiment of the present invention in which a roller guide surface 22 is formed with two planes. An oil sump 23 is formed between the area adjacent to the points where the two planes intersect and the spherical roller 21.

FIG. 5 shows the third embodiment of the present invention in which each roller 25 rolling on the cylindrical guide surface 24 is spherical at both end portions 26 and cylindrical at its central portion 27, and is in contact with the guide surface 24 at two points. An oil sump 28 is formed between the guide surface 24 and the roller 25.

FIG. 6 shows the fourth embodiment of the present invention in which each roller guide surface 29 is formed with two planes, and the points of contact P1 and P2 with the spherical roller 21 are arranged unsymmetrically with respect to the center line X—X of the spherical roller 21.

Figure 11:
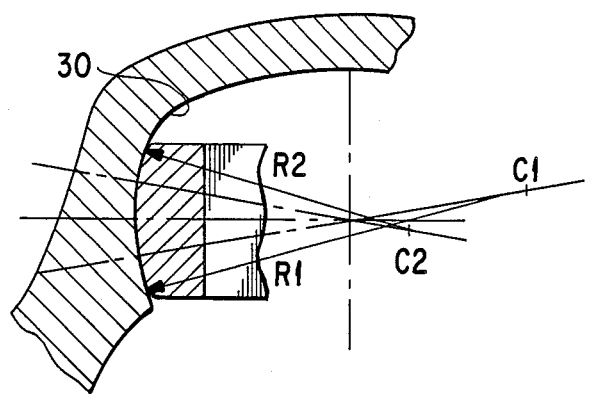

FIG. 11 shows the fifth embodiment of the present invention in which each roller guide surface 30 has two centers of curvature C1, C2 and the radii of curvature R1, R2 for the centers of curvature C1, C2 are different from each other.

In the first embodiment of FIG. 3, the contact angles formed between the roller guide surface and the spherical roller at two points are equal to each other, whereas in the fourth embodiment of FIG. 6 the contact angles are different from each other.

What is claimed is:

1. A slidable-type homokinetic tripod joint comprising:
   an outer member formed in its inner surface with three track grooves extending axially and equally angularly spaced about its axis, each of said track grooves being formed at each side thereof with a roller guide surface extending in the direction of axis of said outer member;
   a tripod member having three trunnions projecting radially and equally angularly spaced around its axis, said tripod member being mounted in said outer member with said trunnions on said tripod member received in said respective track grooves in said outer member,
   a spherical roller rotatably mounted on said each trunnion and having outer periphery thereof guided by said roller guide surfaces,
   one of each said outer periphery of said roller and its respective guide surface being formed such that each said spherical roller is in contact with said roller guide surface at only two points during rotation of the joint.

2. A slidable-type homokinetic tripod joint as claimed in claim 1, wherein said roller guide surface has two centers of curvature.

3. A slidable-type homokinetic tripod joint as claimed in claim 2, wherein contact angles formed between said spherical roller and roller guide surface at said two points are different from each other and the radii of curvature for said centers of curvature are different from each other.

4. A slidable-type homokinetic tripod joint as claimed in claim 2, wherein contact angles formed between said spherical roller and said roller guide surface at said two points are equal to each other and the radii of curvature for said centers of curvature are equal to each other.

5. A slidable-type homokinetic tripod joint as claimed in claim 1, wherein said roller guide surface is formed with two planes.

6. A slidable-type homokinetic tripod joint as claimed in claim 5, wherein contact angles formed between said spherical roller and said roller guide surface at said two points are different from each other.

7. A slidable-type homokinetic tripod joint as claimed in claim 5, wherein contact angles formed between said spherical roller and said roller guide surface at said two points are equal to each other.

* * * * *